(12) United States Patent
Belcea

(10) Patent No.: US 7,072,432 B2
(45) Date of Patent: Jul. 4, 2006

(54) SYSTEM AND METHOD FOR CORRECTING THE CLOCK DRIFT AND MAINTAINING THE SYNCHRONIZATION OF LOW QUALITY CLOCKS IN WIRELESS NETWORKS

(75) Inventor: John M. Belcea, West Melbourne, FL (US)

(73) Assignee: MeshNetworks, Inc., Maitland, FL (US)

( * ) Notice: Subject to any disclaimer, the term of this patent is extended or adjusted under 35 U.S.C. 154(b) by 306 days.

(21) Appl. No.: 10/188,982

(22) Filed: Jul. 5, 2002

(65) Prior Publication Data

US 2004/0005902 A1   Jan. 8, 2004

(51) Int. Cl.
*H04L 7/00*   (2006.01)

(52) U.S. Cl. ........... 375/356; 375/354; 713/400; 370/235; 370/503; 370/509

(58) Field of Classification Search ........ 375/354–356, 375/371; 370/238, 280, 337, 352, 389, 516, 370/235, 503, 509; 455/426.1, 445, 502; 707/203; 713/400; 327/165, 292
See application file for complete search history.

(56) References Cited

U.S. PATENT DOCUMENTS

| | | | |
|---|---|---|---|
| 4,494,192 A | 1/1985 | Lew et al. | 364/200 |
| 4,617,656 A | 10/1986 | Kobayashi et al. | 370/74 |
| 4,736,371 A | 4/1988 | Tejima et al. | 370/95 |
| 4,742,357 A | 5/1988 | Rackley | 342/457 |
| 4,747,130 A | 5/1988 | Ho | 379/269 |
| 4,910,521 A | 3/1990 | Mellon | 342/45 |
| 5,034,961 A | 7/1991 | Adams | 375/130 |
| 5,068,916 A | 11/1991 | Harrison et al. | 455/39 |
| 5,231,634 A | 7/1993 | Giles et al. | 370/95.1 |
| 5,233,604 A | 8/1993 | Ahmadi et al. | 370/60 |
| 5,241,542 A | 8/1993 | Natarajan et al. | 370/95.3 |
| 5,317,566 A | 5/1994 | Joshi | 370/60 |
| 5,386,542 A | 1/1995 | Brann et al. | 395/550 |
| 5,392,450 A | 2/1995 | Nossen | 455/12.1 |
| 5,402,394 A | 3/1995 | Turski | 368/10 |
| 5,408,506 A | 4/1995 | Mincher et al. | 375/356 |
| 5,412,654 A | 5/1995 | Perkins | 370/94.1 |
| 5,424,747 A | 6/1995 | Chazelas et al. | 342/70 |
| 5,502,722 A | 3/1996 | Fulghum | 370/69.1 |
| 5,517,491 A | 5/1996 | Nanni et al. | 370/29 |
| 5,535,217 A | 7/1996 | Cheung et al. | 370/100.1 |

(Continued)

FOREIGN PATENT DOCUMENTS

CA   2132180   3/1996

(Continued)

OTHER PUBLICATIONS

David L. Mills, "Internet Time Synchronization:The Network Time Protocol",IEEE Transactions on Communications, vol. 39, No. 10, Oct. 1991.*

(Continued)

*Primary Examiner*—Khai Tran
*Assistant Examiner*—Edith Chang
(74) *Attorney, Agent, or Firm*—Randi L. Karpinia; Joseph J. Buczynski

(57) ABSTRACT

A system and method for establishing and maintaining node clock synchronization in a wireless network. The system and method calculates the clock shift, clock drift and propagation delay values using a series of message exchanges and control algorithms between a selected reference node and a client node in a wireless network, then uses these values to synchronize the client node clock to the reference node clock.

36 Claims, 9 Drawing Sheets

U.S. PATENT DOCUMENTS

| | | | | |
|---|---|---|---|---|
| 5,555,425 | A | 9/1996 | Zeller et al. | 395/800 |
| 5,555,540 | A | 9/1996 | Radke | 370/16.1 |
| 5,572,528 | A | 11/1996 | Shuen | 370/85.13 |
| 5,615,212 | A | 3/1997 | Ruszczyk et al. | 370/433 |
| 5,618,045 | A | 4/1997 | Kagan et al. | 463/40 |
| 5,621,732 | A | 4/1997 | Osawa | 370/79 |
| 5,623,495 | A | 4/1997 | Eng et al. | 370/397 |
| 5,627,976 | A | 5/1997 | McFarland et al. | 395/308 |
| 5,631,897 | A | 5/1997 | Pacheco et al. | 370/237 |
| 5,644,576 | A | 7/1997 | Bauchot et al. | 370/437 |
| 5,652,751 | A | 7/1997 | Sharony | 370/227 |
| 5,680,392 | A | 10/1997 | Semaan | 370/261 |
| 5,684,794 | A | 11/1997 | Lopez et al. | 370/337 |
| 5,687,194 | A | 11/1997 | Paneth et al. | 375/283 |
| 5,696,903 | A | 12/1997 | Mahany | 395/200.58 |
| 5,701,294 | A | 12/1997 | Ward et al. | 370/252 |
| 5,706,428 | A | 1/1998 | Boer et al. | 395/200 |
| 5,717,689 | A | 2/1998 | Ayanoglu | 370/349 |
| 5,745,483 | A | 4/1998 | Nakagawa et al. | 370/335 |
| 5,774,876 | A | 6/1998 | Wooley et al. | 705/28 |
| 5,781,540 | A | 7/1998 | Malcolm et al. | 370/321 |
| 5,787,080 | A | 7/1998 | Hulyalkar et al. | 370/348 |
| 5,794,154 | A | 8/1998 | Bar-On et al. | 455/509 |
| 5,796,732 | A | 8/1998 | Mazzola et al. | 370/362 |
| 5,796,741 | A | 8/1998 | Saito et al. | 370/439 |
| 5,805,593 | A | 9/1998 | Busche | 370/396 |
| 5,805,842 | A | 9/1998 | Nagaraj et al. | 395/306 |
| 5,805,977 | A | 9/1998 | Hill et al. | 455/31.3 |
| 5,809,518 | A | 9/1998 | Lee | 711/115 |
| 5,822,309 | A | 10/1998 | Ayanoglu et al. | 370/315 |
| 5,844,905 | A | 12/1998 | McKay et al. | 370/443 |
| 5,845,097 | A | 12/1998 | Kang et al. | 395/297 |
| 5,857,084 | A | 1/1999 | Klein | 395/309 |
| 5,870,350 | A | 2/1999 | Bertin et al. | 365/233 |
| 5,877,724 | A | 3/1999 | Davis | 342/357 |
| 5,881,095 | A | 3/1999 | Cadd | 375/202 |
| 5,881,372 | A | 3/1999 | Kruys | 455/113 |
| 5,886,992 | A | 3/1999 | Raatikainen et al. | 370/410 |
| 5,896,561 | A | 4/1999 | Schrader et al. | 455/67.1 |
| 5,903,559 | A | 5/1999 | Acharya et al. | 370/355 |
| 5,907,685 | A | 5/1999 | Douceur | 395/200.78 |
| 5,909,651 | A | 6/1999 | Chander et al. | 455/466 |
| 5,936,953 | A | 8/1999 | Simmons | 370/364 |
| 5,943,322 | A | 8/1999 | Mayor et al. | 370/280 |
| 5,987,011 | A | 11/1999 | Toh | 370/331 |
| 5,987,033 | A | 11/1999 | Boer et al. | 370/445 |
| 5,991,279 | A | 11/1999 | Haugli et al. | 370/311 |
| 6,028,853 | A | 2/2000 | Haartsen | 370/338 |
| 6,029,217 | A | 2/2000 | Arimilli et al. | 710/107 |
| 6,034,542 | A | 3/2000 | Ridgeway | 326/39 |
| 6,044,062 | A | 3/2000 | Brownrigg et al. | 370/238 |
| 6,047,330 | A | 4/2000 | Stracke, Jr. | 709/238 |
| 6,052,594 | A | 4/2000 | Chuang et al. | 455/450 |
| 6,052,752 | A | 4/2000 | Kwon | 710/126 |
| 6,064,626 | A | 5/2000 | Stevens | 365/233 |
| 6,067,291 | A | 5/2000 | Kamerman et al. | 370/338 |
| 6,073,005 | A | 6/2000 | Raith et al. | 455/404 |
| 6,078,566 | A | 6/2000 | Kikinis | 370/286 |
| 6,104,712 | A | 8/2000 | Robert et al. | 370/389 |
| 6,108,738 | A | 8/2000 | Chambers et al. | 710/113 |
| 6,115,580 | A | 9/2000 | Chuprun et al. | 455/1 |
| 6,122,690 | A | 9/2000 | Nannetti et al. | 710/102 |
| 6,130,881 | A | 10/2000 | Stiller et al. | 370/238 |
| 6,132,306 | A | 10/2000 | Trompower | 453/11.1 |
| 6,147,975 | A | 11/2000 | Bowman-Amuah | 370/252 |
| 6,157,957 | A | 12/2000 | Berthaud | 709/248 |
| 6,163,699 | A | 12/2000 | Naor et al. | 455/453 |
| 6,178,337 | B1 | 1/2001 | Spartz et al. | 455/561 |
| 6,192,053 | B1 | 2/2001 | Angelico et al. | 370/448 |
| 6,192,230 | B1 | 2/2001 | van Bokhorst et al. | 455/343 |
| 6,208,870 | B1 | 3/2001 | Lorello et al. | 455/466 |
| 6,223,240 | B1 | 4/2001 | Odenwald et al. | 710/129 |
| 6,240,294 | B1 | 5/2001 | Hamilton et al. | 455/456 |
| 6,246,875 | B1 | 6/2001 | Seazholtz et al. | 455/432 |
| 6,249,516 | B1 | 6/2001 | Brownrigg et al. | 370/338 |
| 6,275,707 | B1 | 8/2001 | Reed et al. | 455/456 |
| 6,285,892 | B1 | 9/2001 | Hulyalkar | 455/574 |
| 6,304,556 | B1 | 10/2001 | Haas | 370/254 |
| 6,327,300 | B1 | 12/2001 | Souissi et al. | 375/219 |
| 6,349,091 | B1 | 2/2002 | Li | 370/238 |
| 6,349,210 | B1 | 2/2002 | Li | 455/450 |
| 6,400,683 | B1 | 6/2002 | Jay et al. | 370/229 |
| 2001/0053699 | A1 | 12/2001 | McCrady et al. | 455/513 |
| 2002/0136335 | A1* | 9/2002 | Liou et al. | 375/354 |

FOREIGN PATENT DOCUMENTS

| | | | |
|---|---|---|---|
| EP | 0513841 | A2 | 11/1992 |
| EP | 0627827 | A2 | 12/1994 |
| EP | 0924890 | A2 | 6/1999 |
| GB | 2 353 450 | A * | 2/2001 |
| WO | WO 9608884 | | 3/1996 |
| WO | WO 9724005 | | 7/1997 |
| WO | WO 9839936 | | 9/1998 |
| WO | WO 9912302 | | 3/1999 |
| WO | WO 0034932 | | 6/2000 |
| WO | WO 0110154 | | 2/2001 |
| WO | WO 0133770 | | 5/2001 |
| WO | WO 0135567 | | 5/2001 |
| WO | WO 0137481 | | 5/2001 |
| WO | WO 0137482 | | 5/2001 |
| WO | WO 0137483 | | 5/2001 |
| WO | WO 0235253 | | 5/2002 |

OTHER PUBLICATIONS

David L. Mills, "Internet Time Synchronization: The Network Time Protocol", IEEE Transactions on Communications, vol. 39, No. 10, Oct. 1991.

Wong et al., "Soft Handoffs in CDMA Mobile Systems", Dec. 1997, IEEE Personal Communications.

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar. 3, 1999, 2nd Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Self-Healing Wireless Networks", 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenyu Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

* cited by examiner

SYSTEM AND METHOD FOR CORRECTING THE CLOCK DRIFT AND MAINTAINING THE SYNCHRONIZATION OF LOW QUALITY CLOCKS IN WIRELESS NETWORKS

CROSS-REFERENCE TO RELATED APPLICATIONS

Related subject matter is disclosed in a U.S. patent application of John M. Belcea entitled "A System and Method for Computing the Signal Propagation Time and the Clock Correction for Mobile Stations in a Wireless Network", application Ser. No. 09/996,603, filed on Nov. 30, 2001, the entire contents of which being incorporated herein by reference.

BACKGROUND OF THE INVENTION

1. Field of the Invention

The present invention relates to a system and method for synchronizing node clocks in a wireless network. More particularly, the present invention relates to a system and method for calculating clock shift, clock drift and propagation delays between a selected reference node and a client node in a wireless network. The calculated shift, drift and propagation delay values are used for accurate clock synchronization between the reference node and the client node clocks, and for computing the distance between nodes.

2. Description of the Related Art

In recent years, a type of mobile communications network known as an "ad-hoc" network has been developed to address the needs of multiple mobile device communication beyond traditional infrastructure coverage. In this type of network, each user terminal (hereinafter "mobile node") is capable of operating as a mobile repeater or mobile router for other mobile nodes within the network, thus eliminating the need for a fixed infrastructure of base stations. Accordingly, data packets being sent from a source mobile node to a destination mobile node are typically routed through a number of intermediate nodes before reaching a destination node.

More sophisticated ad-hoc networks are also being developed which, in addition to enabling mobile nodes to communicate with each other as in conventional ad-hoc networks, further enable the mobile nodes to access fixed networks and communicate with other types of user terminals, such as those on the public switched telephone network (PSTN) and the Internet. Details of these advanced types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, and in U.S. patent application Ser. No. 09/815,164 entitled "Prioritized-Routing for an Ad-Hoc, Peer-to-Peer, Mobile Radio Access System", filed on Mar. 22, 2001, the entire content of each application being incorporated herein by reference.

The purpose of such networks, either wired or wireless, is to transmit data from one node to another. In wireless networks, this information is transferred as a sequence of messages between nodes. However, before transmitting the data message that actually contains the information, some control messages, or "overhead information", are exchanged between participants. This assures that during the data transfer, no other activity (i.e. transmission) takes place in the same channel, and that both correspondents are tuned on the same frequency, one correspondent ready to transmit and the other ready to receive. After the data transfer is completed, the recipient replies with a message confirming the quality of the received data. This allows the transmitter of the data to adjust the characteristics of the next data transfer or repeat the last transfer at different transmission characteristics if data has not been received correctly.

The amount of overhead information exchanged in these wireless networks can become very large and adversely affect network capacity, especially when data packets are small and transmissions frequent. The amount of overhead exchanges can be reduced substantially however, by implementing activity planning using time slotting techniques. Unfortunately, such planning methods require a degree of clock synchronization between mobile nodes in the network, which is difficult in systems with low quality clocks.

For infrequent transmissions or transmissions of very large packets of data, the overhead for preparing the transmission is not important. Overhead transmissions however, become a burden when transmitted data is presented in small packets and these packets are transmitted frequently. Voice data packets are a good example of small, frequent data packet transmissions. Voice packets typically have less than 128 bytes of data and are repeated about 30 times every second. The amount of overhead information associated with the data stream presented in small, frequent transmissions can be reduced using various methods of planning. These methods provide both parties with all the information needed for assuring that only one transmission happens in one frequency and each-correspondent is tuned to the same frequency, at the same time, without using such high levels of overhead transmissions.

One method for planning efficient data transfer is to divide the transmission time into Time Frames (TF), each Time Frame further divided into Time Slots (TS). Such divisions of time allow the planning of frequent transmissions at Time Frame levels. Since the TS utilization does not change from one TF to another, the overhead information is exchanged only once before starting the communication and remains active for the duration of the transmission, or until rerouting of the transmission is necessary. For implementing methods using TF and TS however, it is first necessary to synchronize the clocks of participating nodes.

Clock synchronization is often used to describe any method dealing with clock adjustments at one or more nodes in a wired or wireless network. These may include converting a local time base to match a remote time base using a conversion function, or merely receiving information concerning a remote time base for reference purposes. For example, timing information between nodes may be exchanged in order to determine a basic conversion function existing between each node. Such message exchanges are discussed in U.S. Pat. No. 6,157,957 entitled "Clock Synchronization System And Method Using A Continuous Conversion Function For A Communication Network" issued Dec. 5, 2000 to Jean-Marc Berthaud, the entire content of which is incorporated herein by reference. The method presented in the Berthaud Patent directs the collection and storage of multiple message exchanges into a History data register. The register may then be used for computing a conversion function for converting a local clock value to a master time base. However, the Berthaud Patent fails to consider the asymmetry of exchange delays resulting from network queues created by communication traffic. Furthermore, the extensive processing of the History data registers to produce conversion functions is limited in mobile node applications, which are typically controlled by low speed CPUs and often lack the capability to perform floating-point operations. Further methods for calculating time bases at other nodes without adjusting local time bases are presented in U.S. Pat. No. 5,402,394 entitled "Process For Generating A Common Time Base For A System With Distributed Computing Units" issued Mar. 28, 1995 to Klaus Turski, the entire content of which is incorporated herein by reference.

The actual message exchanges between nodes for synchronization are often dependent upon node network configuration. One configuration, a closed loop communication ring, may pass messages through each node of the ring until the message, and any associated data, is returned to the originating node within the ring. Such a method may satisfy requirements in ring networks, however in the simplest configuration where a ring network is comprised of only two nodes, the message exchange may become excessive. Additional details of synchronization exchanges in communication rings are presented in U.S. Pat. No. 5,907,685 entitled "System And Method For Synchronizing Clocks In Distributed Computer Nodes" issued May 25, 1999 to John R. Douceur, and in U.S. Pat. No. 5,386,542 entitled "System For Generating A Time Reference Value In The MAC Layer Of An ISO/OSI Communications Model Among A Plurality Of Nodes" issued Jan. 31, 1995 to Brann et al., the entire content of each is incorporated herein by reference.

Where exchanges are used to adjust the local clock to correspond with a remote clock, several message exchange variables must be considered, such as message propagation times. Furthermore, clock synchronization between mobile nodes in an ad-hoc wireless network encounters additional difficulties, including clock shift and clock drift. For example, consider nodes A and B in a wireless network. At any given time t, the clock registers on each node A and B, will show values $t_A$ and $t_b$. The difference between the two values, $t_A - t_B$, is the "clock shift" between the two nodes. The clock shift value must be added as a correction to either clock to make each show the same value. From equation (1) below, $\Delta_{AB}$ is shown to be the correction to be applied to the clock value at node A, and $\Delta_{BA}$ is shown to be the correction to be applied to the clock value at node B.

$$\Delta_{AB} = t_B - t_A = -\Delta_{BA} \quad (1)$$

Where $t_B$ is the clock value at node B at time t, and $t_A$ is the clock value at node A at time t.

If no other clock adjustments are made, after some time, clock registers A and B will show values $t'_A$ and $t'_B$ where the clock shift for each may again be determined using equation (1).

$$\Delta'_{AB} = t'_B - t'_A = -\Delta'_{BA}$$

Where $t'_B$ is the clock value at node B at time t', and $t'_A$ is the clock value at node A at the same time t'.

It is not unusual to observe that $\Delta_{AB}$ and $\Delta'_{AB}$ are not the same. Variations between $\Delta_{AB}$ and $\Delta'_{AB}$ are due, in part, to the fact that both nodes A and B may have clocks driven by oscillators running at different frequencies. Specifically, each node measured the same time (t'-t) in different units. Frequency variations may result in a time period, as measured with one clock, to be longer or shorter then an identical period measured with the second clock (i.e. node A clock measured an identical period differently than node B clock). Furthermore, neither measurement may equal the actual duration of the standard value for the period (i.e. neither clock measured the period correctly).

Another difficulty encountered is "clock drift". The variation in clock shift values from time t to time t' is the clock drift of the clock, and may be determined using equation (2).

$$\delta_{AB} = \frac{\Delta_{AB} - \Delta'_{AB}}{t_A - t'_A} \quad (2)$$

$$\delta_{BA} = -\frac{\Delta_{AB} - \Delta'_{AB}}{t_B - t'_B}$$

Where $\Delta_{AB}$ is the shift value between nodes A and B at time t, and $\Delta'_{AB}$ is the shift value between nodes A and B at time t'. Variables $t_A$ and $t_B$ are the clock register values of nodes A and B at time t, respectively. Finally, variables $t'_A$ and $t'_B$ are the clock register values of nodes A and B at time t', respectively.

The relations between clock drifts of equation (2) are shown in equation (3).

$$\delta_{AB} = -\frac{\delta_{BA}}{1 + \delta_{BA}} \quad (3)$$

$$\delta_{BA} = -\frac{\delta_{AB}}{1 + \delta_{AB}}$$

As stated above, variations are due in part to the fact that both nodes A and B may have clocks driven by oscillators running at different frequencies. The frequency difference that causes the clock drift is usually measured in parts-per-million (ppm). The quartz crystal controlling the oscillator in certain system hardware circuit boards may have precision levels better than ±1 ppm, meaning that within a period of one second, the clock values on two circuit boards can drift (clock drift) by less than 2 μs, or 2 ms in about 17 minutes. Although such a clock drift appears to be large, oscillators controlled with quartz crystals typically maintain a constant frequency over relatively long periods of time, which causes the drift, regardless of magnitude, to remain almost constant. However, to some degree, slow variations of clock drift values may result from temperature changes or, on unshielded boards, surrounding capacitance effects.

Prior discussions of clock synchronization recognize the difficulties arising from frequency differences, or "skew", between node clocks. One solution is the creation of a phase-correction term, processed by a loop filter to control the local clock, which functions as a voltage-controlled oscillator. However this solution is restricted to nodes implementing local clocks having exceptionally stable local oscillators and loop filters. Additional details of voltage-controlled oscillators in clock control are discussed in a paper presented by David L. Mills entitled "Internet Time Synchronization: The Network Time Protocol", the entire content of which is incorporated herein by reference.

Given these difficulties in mobile node clock synchronization, a need exists for a system and method for fast clock synchronization and dynamic drift correction of node clocks and for maintaining synchronization over long periods of time.

SUMMARY OF THE INVENTION

An object of the present invention is to provide a system and method for calculating clock shift and clock drift between nodes in an ad-hoc wireless network.

Another object of the present invention is to provide a system and method for synchronizing node clocks in an ad-hoc wireless network using calculated values of clock shift and clock drift values.

These and other objects are substantially achieved by a system and method for exchanging multiple synchronization messages between a selected reference node and a client node, from which clock shift, clock drift and propagation delay values may be determined and then used to synchronize the client node clock to the reference node clock and compute mobile node location.

BRIEF DESCRIPTION OF THE DRAWINGS

These and other objects, advantages and novel features of the invention will be more readily appreciated from the following detailed description when read in conjunction with the-accompanying drawings, in which.

DETAILED DESCRIPTION OF THE PREFERRED EMBODIMENTS

Figure 1:
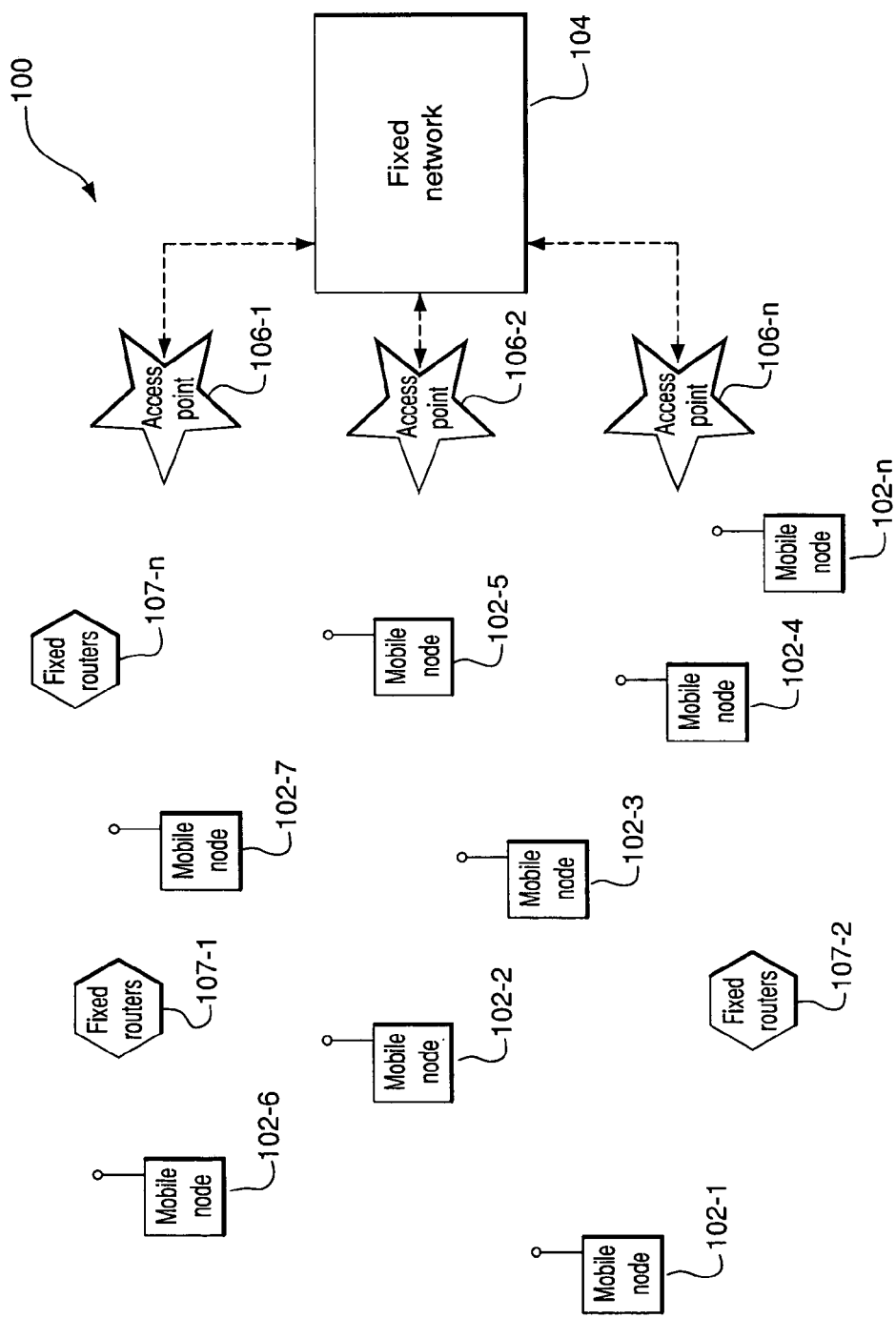
FIG. 1 is a block diagram of an example of an ad-hoc wireless communications network including a plurality of nodes and employing an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes or mobile nodes 102), and a fixed network 104 having a plurality of access points 106-1, 106-2, . . . 106-n (referred to generally as nodes or access points 106), for providing the nodes 102 with access to the fixed network 104. The fixed network 104 includes, for example, a core local access network (LAN), and a plurality of servers and gateway routers, to provide the nodes 102 with access to other networks, such as other ad-hoc networks, the public switched telephone network (PSTN) and the Internet. The network 100 further includes a plurality of fixed routers 107-1 through 107-n (referred to generally as nodes or fixed routers 107) for routing data packets between other nodes 102, 106 or 107.

Figure 2:
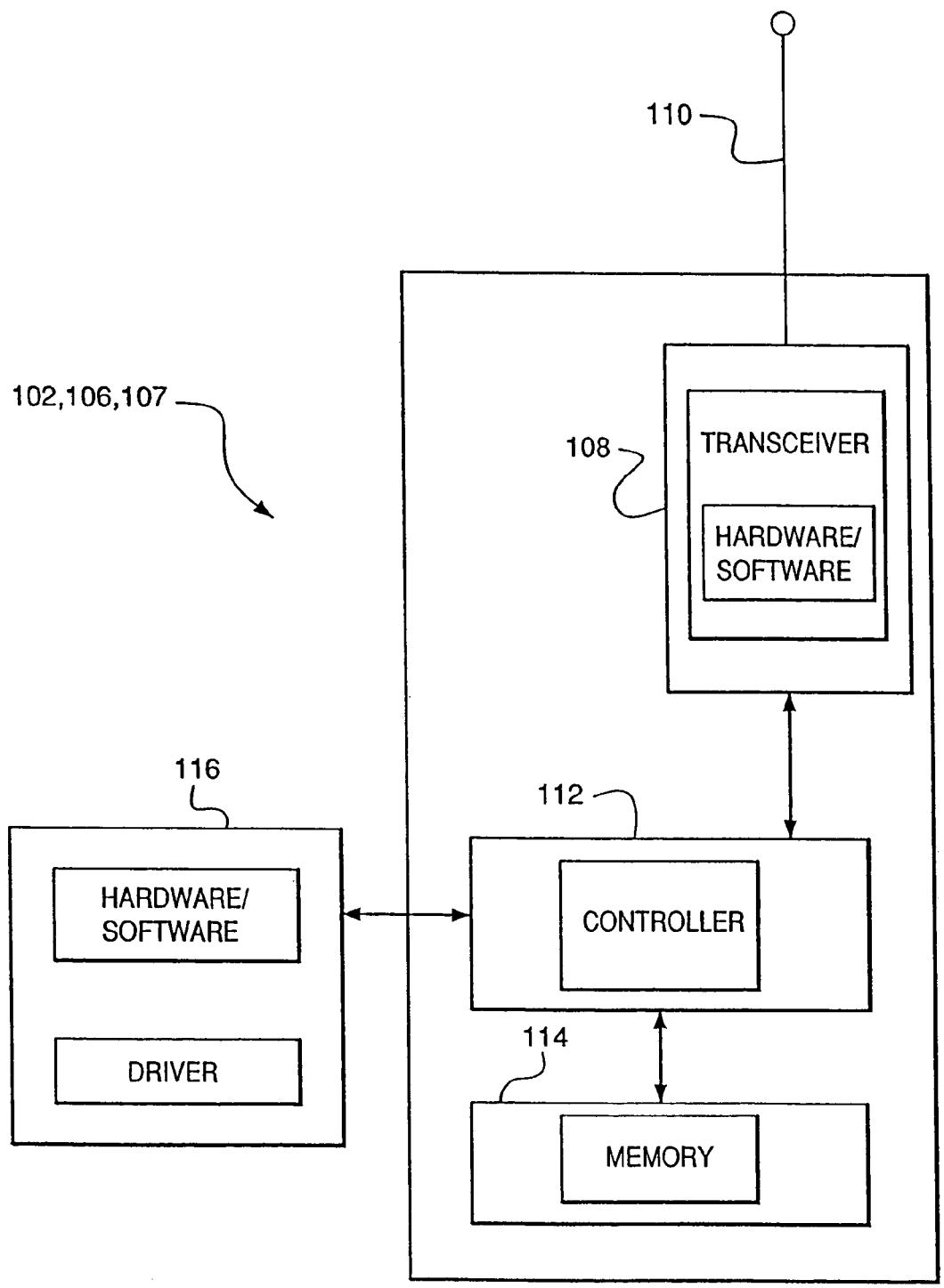
FIG. 2 is a block diagram of an example of a wireless node as shown in FIG. 1.

As can be appreciated by one skilled in the art, the nodes 102, 106 and 107 are capable of communicating with each other directly, or via one or more other nodes 102, 106 or 107 operating as a router or routers for data packets being sent between nodes, as described in U.S. Pat. No. 5,943,322 to Mayor, which is incorporated herein by reference, and in U.S. patent application Ser. Nos. 09/897,790, 09/815,157 and 09/815,164 referenced above. Specifically, as shown in FIG. 2, each node 102, 106 and 107 includes a transceiver 108 which is coupled to an antenna 110 which collectively can be referred to as a modem, and which is capable of receiving and transmitting signals, such as packetized data signals, to and from the node 102, 106 or 107, under the control of a controller 112. The packetized data signals can include, for example, voice, data or multimedia information.

Each node 102, 106 and 107 further includes a memory 114, such as a random access memory (RAM), that is capable of storing, among other things, routing information pertaining to itself and other nodes 102, 106 or 107 in the network 100. The nodes 102, 106 and 107 exchange their respective routing information, referred to as routing advertisements or routing table information, with each other periodically via a broadcasting mechanism, for example, when a new node 102 enters the network 100, or when existing nodes 102 in the network 100 move.

As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included. Additionally, each node also includes the appropriate hardware and software to perform time of arrival (TOA) calculations.

As stated in the Background section, the amount of overhead information exchanged in wireless networks can become very large when data packets are small and transmissions frequent, adversely affecting network capacity. Additionally, methods reducing overhead information exchanges often require accurate clock synchronization between nodes of the network. For example, to implement Time Frame (TF) and Time Slot (TS) methods to reduce overhead exchanges, it is necessary to synchronize the clocks of participating nodes. The clocks can be, for example in FIG. 2, part of the controller 112, or an entirely separate clocking unit. The embodiment of the present invention described below synchronizes all such node clocks, including clocks controlled with quartz driven oscillators, and maintains clock synchronization over long periods of time.

The synchronization of two or more node clocks in a wireless network in accordance with an embodiment of the present invention first requires the selection of one clock as a reference and each remaining node clock may then be synchronized to the reference node clock when required. In a network of mobile nodes such as network 100 of FIG. 1, one particular node 102, 106 or 107 is elected to provide the clock reference. If, for illustration purposes, node 106-2 is elected as the reference node, and node 102-4 is to be synchronized with the clock of 106-2, a message exchange between nodes 106-2 and 102-4 is begun as shown in FIG. 3.

Figure 3:
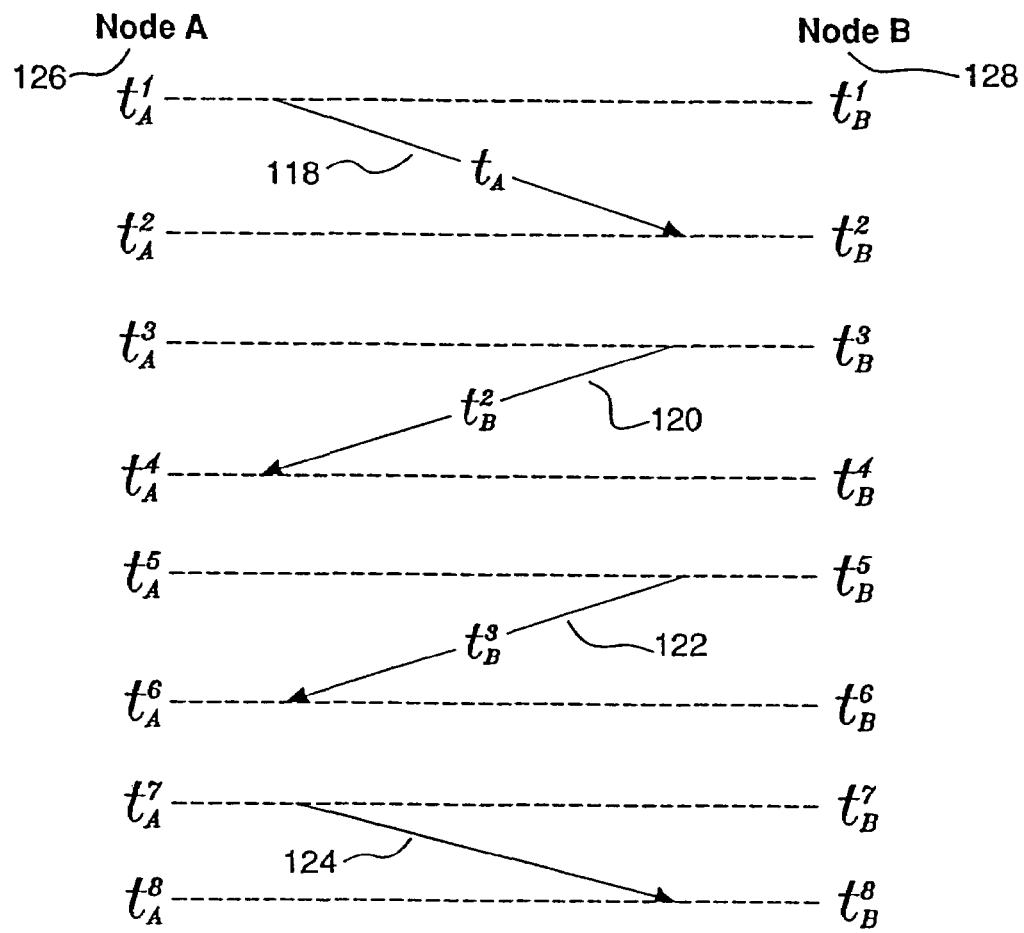
FIG. 3 is a block diagram illustrating an example of a clock synchronization message exchange in accordance with an embodiment of the present invention.

In the example of FIG. 3, node 106-2 (node A) and node 102-4 (node B) are located in a wireless network and are presented as requiring clock synchronization for communication purposes. If node A is selected as the "reference" node, the shift $\Delta_{BA}$ and clock drift $\delta_{BA}$ of node B in reference to node A must first be determined. In the following explanation, upper digits are event numbers. For example, $t_B^2$ is the reading of the clock at node B when a second event occurred, and so forth.

To determine the clock shift $\Delta_{BA}$ and clock drift $\delta_{BA}$, node A of FIG. 3 transmits a message 118 to node B for starting the clock synchronization procedure, and records the time $t^{41}$ when the message was transmitted. At that moment, the clock at station B shows time $t_B^1$, which is equal to time $t_A^1$ plus the clock shift, as shown in equation (4).

$$t_B^1 = t_A^1 + \Delta_{BA} \quad (4)$$

The message 118 from node A is received at node B at time $t_B^2$, which is equal to $t_B^1$ plus the message propagation time between nodes A and B, as shown in equation (5).

$$t_B^2 = t_B^1 + p_{AB} = t_A^1 + \Delta_{AB} + p_{AB} \quad (5)$$

Where $p_{AB}$ is the signal propagation time from node A to node B.

At time $t_B^3$ station B responds to the message 118 sent by node A with a message 120 containing the value of the clock at node B when the message 118 from node A was received (i.e. $t_B^2$). The message 120 from node B is received by node A at time $t_B^4$, which is equal to $t_B^3$ plus the clock shift and the message propagation time between nodes A and B, shown using equation (5) with new values.

$$t_A^4 = t_A^3 + p_{BA} = t_B^3 + \Delta_{AB} + p_{BA} = t_B^3 - \Delta_{BA} + p_{BA}$$

Shortly, node B transmits still another message 122 to node A containing the time $t_B^3$ when the previous message 120 was transmitted by node B to node A.

From times $t_A^1$ and $t_A^4$, values which are known directly by node A, and from times $t_B^2$ and $t_B^3$ known indirectly by node A from messages received from node B, node A can compute the propagation time $p_{AB}$ and the clock shift $\Delta_{BA}$ values existing between nodes A and B using equation (6), given that the propagation time in both directions is the same.

$$t_A^4 - t_B^3 = -\Delta_{BA} + p_{BA}$$

$$t_B^2 - t_A^1 = \Delta_{BA} + p_{AB}$$

$$p_{AB} = p_{BA} = \frac{(t_A^4 - t_B^3) + (t_B^2 - t_A^1)}{2} \quad (6)$$

$$\Delta_{BA} = \frac{(t_B^2 - t_A^1) - (t_A^4 - t_B^3)}{2}$$

After computing the propagation and clock shift in equation (6), node A transmits the values of $p_{AB}$ and $\Delta_{AB}$ to node B in message 124. Node B then uses the values of $p_{AB}$ and $\Delta_{AB}$ from node A to synchronize it's clock with the clock of node A.

Clock readings at the server, or node A, at times $t_A^1$ and $t_A^4$ are 32 bit values. For saving transmission time, clock readings at the client, or node B, at times $t_B^2$ and $t_B^3$ are transmitted in messages as 8 bit values. All values are positive, but a "wrap around" may occur for either value. Time "wrap around" is identified when events are out of order. The normal sequence of events is $t_A^1 < t_A^4$ and $t_B^2 < t_B^3$ (in reference to equation (6). When these values are out of sequence, the time wrap around correction ($2^{32}$ or $2^8$) must be applied.

After few seconds, at a time t', the message exchange described in FIG. 3 between nodes A and B is repeated, and a second series of values are used for computing the new propagation time and the new clock shift needed to apply at node B.

$$t_A'^4 - t_B'^3 = -\Delta_{BA}' + p_{BA}' \quad (7)$$

$$t_B'^2 - t_A'^1 = \Delta_{BA}' + p_{AB}'$$

$$p_{AB}' = p_{BA}' = \frac{(t_A'^4 - t_B'^3) + (t_B'^2 - t_A'^1)}{2}$$

$$\Delta_{BA}' = \frac{(t_B'^2 - t_A'^1) - (t_A'^4 - t_B'^3)}{2}$$

If the clock frequencies of nodes A and B do not differ significantly from one another, the new computed clock shift $\Delta'_{BA}$ determined in equation (7) should be zero. If it is not zero, indicating clock drift is occurring, the new clock shift $\Delta'_{BA}$ is used for synchronizing the clock of node B with the clock of node A once again, and for compensating for clock drift using a drift control algorithm presented in the Appendix and discussed in greater detail below.

The frequency of clock shift correction may be varied based upon application. If a correction value of zero is generated during a synchronization procedure, the time interval until the next clock control session can be doubled, up to 900 seconds. The interval between first and second sessions may have any value, but values of less than one second are not practical.

In the embodiment of the present invention described herein, the clock of node B is assumed to have an accuracy of +/−1 μs. Furthermore, the propagation time from node A to node B is assumed to equal the propagation time from node B to node A. To maintain $p_{AB} = p_{BA}$, it is necessary that the distance between nodes A and B does not change by more than 300 meters during the synchronization process of FIG. 3. Since the exchange of messages between nodes A and B is completed in less than 100 ms, $p_{AB} \neq p_{BA}$ will only occur if either node A or B is moving at a speed greater than 3,000 m/s, or almost 9 times the speed of sound. Therefore, even if signal propagation time is not the same in both directions, the typical clock of node B cannot measure any resulting error due to node movement.

As stated above, if the clock frequencies of nodes A and B do not differ significantly from one another, the new computed clock shift $\Delta'_{BA}$ should be zero. If it is not zero, indicating clock drift is occurring, the new clock shift $\Delta'_{BA}$ is used for synchronizing the clock of node B with the clock of node A once again, and for compensating for clock drift using a drift control algorithm. Clock drift correction is activated upon timer interrupt, activating a drift adjustment function which executes a drift control algorithm described below. Specifically, a periodic timer interrupt at the client is used for activating the drift adjustment function and, depending on the expected precision, the function can be activated at constant intervals between 100 ms and 5 seconds. For 2 ppm relative clock precision, an activation interval of 500 ms or less will maintain an error level between the server and client clocks not exceeding 2 microseconds. A 5 second activation interval will result in an uncorrected shift between the server and client clock as large as 12 microseconds.

The drift control algorithm embodied in the code example of the Appendix may be used to correct for clock drift in the following manner. The algorithm uses the global variable "G_ClockShift" for passing the last shift correction value to the drift control algorithm. The absolute value of the clock shift is stored in the variable G_ClockShift, comprising the value of the clock shift computed at the end of the clock synchronization session, computed and transmitted by the clock server to the client. The algorithm executes the clock adjustment at the client and uses the clock shift variable for drift evaluation and correction, where the drift is a fractional number. Ignoring some of the decimals of the drift has no short time effect, but may be of some importance in the long run.

The drift control algorithm simulates the division of two integer numbers that approximate the drift value. Since the drift value is not known in advance, the algorithm performs continuous adjustments of the values of the two integers according to the value of the clock shift G_ClockShift variable. With each adjustment, the approximation gets closer to the correct value of the drift.

The "drift_Init" function of the algorithm is called every time the client station connects to a new clock server, and sets the initial values of local and global variables. This function must be called just before starting the first clock synchronization session.

Figure 4:
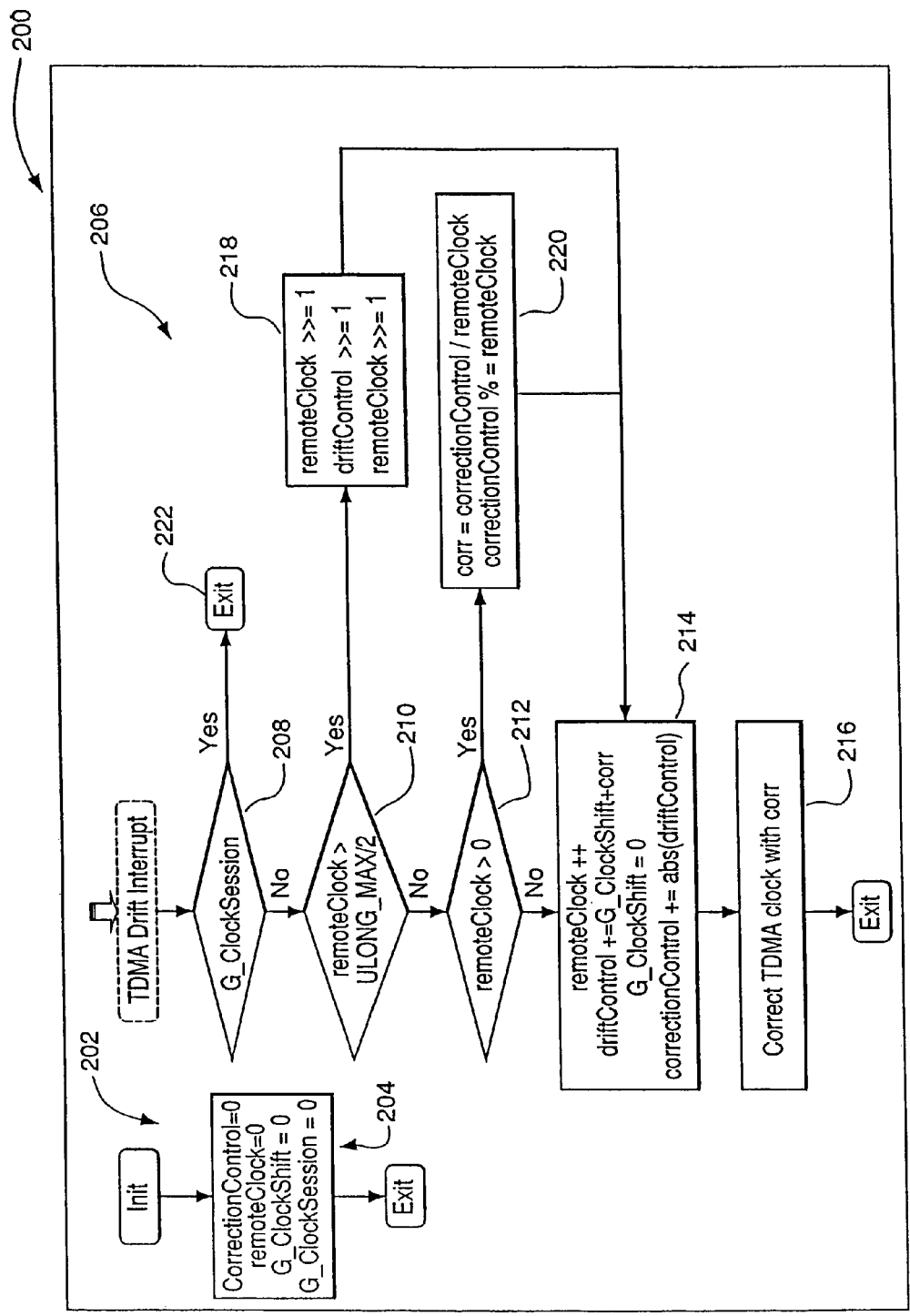
FIG. 4 is a flow chart showing an example of the interrupt service routine (ISR) for clock drift control in accordance with an embodiment of the present invention.

The "drift_ISR" function of the algorithm is the Interrupt Service Routine (ISR) and is activated at constant time intervals. A more detailed description of the ISR is shown in FIG. 4. If the TDMA clock is used for controlling this interrupt, the register associated to interrupt must be adjusted every time the TDMA clock is adjusted in order to maintain the same number of ticks between interrupts. In FIG. 4, a flow chart 200 illustrating an example of ISR for drift control is shown.

On the left side of chart 200 is the initialization procedure 202 that is executed at terminal startup. Procedure 202 sets all variables to zero at block 204. On the right side of chart 200 is the clock drift control procedure 206. The first two blocks 208 and 210 have only auxiliary importance. While the clock synchronization session is executed, the variable "G_ClockSession" has a value of one. The first block 208 of the ISR assures that no drift correction is executed while a clock session is going on. If a G_ClockSession is underway, this is detected in block 208 and the procedure exits at block 222. Such a correction may ruin the clock shift that is computed at the end of the clock session. If no G_ClockSession is underway, the procedure moves to block 210.

Block 210 checks the size of the number stored in the "remoteClock" variable. If the value is too large as detected in block 210, all local variables are divided by two at block 218 and the procedure moves to block 214. During the repeated activation of the ISR these variables are incremented, a fact that can cause arithmetic overflow. If the value is not too large, the procedure moves to block 212.

Block 212 checks the value of the same variable as in block 210 for preventing a division by zero. If the remoteClock variable is not zero, the next correction is computed as variable "corr" and the "correctionControl" takes as value the reminder of the division in block 220. If the remoteClock is zero, the procedure moves to block 214 where the remoteClock is increased by one and the "driftControl" is computed as the summation between the corr and the shift correction computed at the end of the clock session. The G_ClockShift is set to zero because its value has already been used. Finally, the correctionControl is increased with the absolute value of the driftControl.

As a final step, the register of the hardware clock, such as the TDMA clock in this case, is corrected according to the value of the corr variable at block 216. In this ISR, the two local variables correctionControl and remoteClock are static. As static variables, each preserves their values from one ISR activation to the next. The other two variables, G_ClockSession and G_ClockShift are global and their values are set by the function controlling the clock session.

The embodiment described above is achieved using a separate task execution program at both nodes A and B. Specifically, reference node A, which may for example be a network server, executes task functions aptly described as "clock server" tasks (herein also known as reference tasks), while node B, which may be any node 102 being synchronized to the reference node, executes task functions described as "clock client" tasks (herein also known as client tasks).

In the ad-hoc network environment 100 of FIG. 1, typically LAP nodes 106 or the root node of isolated networks, are restricted to providing only clock server tasks, and will never be chosen to execute clock client tasks. That is, an IAP or root node typically may be chosen solely as a reference node in the embodiment of the present invention. The remaining nodes 102 and 107 of the network 100 may be chosen to execute both tasks, as each may be synchronized to a reference clock, and each may provide clock reference to other nodes. Therefore, on the same node, many server tasks may run simultaneously, however only one client task may run. The number of server tasks will equal the number of neighbor nodes requesting to synchronize their clocks. Each server task running on a node will provide clock data to one neighbor node only.

As described earlier in FIG. 3, the messages exchanged between nodes A and B for clock synchronization include,
CLOCKSYNC—a request to start a clock synchronization session, sent by a requesting node to the server on time out;
CLOCKTIME—a reply by the server to the requesting node CLOCKSYNC message, containing the server time as 32 bit value;
CLOCKREPL1—a first reply by the requesting node to the server CLOCKTIME message, containing the $t_B^2$ time when the CLOCKTIME message from the server was received by the requesting node;
CLOCKREPL2—a second reply by the requesting node to the server CLOCKTIME message, containing the $t_B^3$ time when the CLOCKREPL1 message was transmitted from the requesting node; and
CLOCKDATA—a reply by the server to the requesting node concluding the synchronization session, containing the clock shift and propagation time values required by the requesting node to synchronize the clock at the requesting node with the clock at the server.

A first CLOCKSYNC message preceding message 118 may be sent from node B to Node A (this message is described but not shown). This message is a request issued by the requesting node B, or client, seeking a synchronization session. It contains the clock client identification and clock server identification information.

The CLOCKTIME message 118 of FIG. 3 is sent by the server to start the clock synchronization session. The message contains the clock server identification, TDMA registers (32 bit), hop number, connectivity (disconnected or connected), and network type (isolated or land). In the embodiment presented here, server connectivity refers to the connection between the server and a network. A disconnected server has no connections to a network, therefore has no connections to any neighbor nodes. The network type specifies the type of network to which the server is connected. An isolated network does not have land connectivity, where land connectivity can be achieved only by networks via one or more IAPs.

The CLOCKREPL1 message 120 of FIG. 3 is the first reply to the CLOCKTIME message 118. The content of the message 120 includes clock server identification, clock client identification and the clock reading $t_B^2$ when the CLOCKTIME message 118 was received. The CLOCKREPL2 message 122 of FIG. 3 is the second reply to the CLOCKTIME message 118 and contains the clock server identification, clock client identification and the clock reading $t_B^3$ when the CLOCKREPL1 message 120 was transmitted.

In another embodiment of the present invention wherein the modem of nodes A and B have the capability to start transmitting messages at predefined times, both messages CLOCKREPL1 and CLOCKREPL2 can be reduced to one message CLOCKREPL. In this case $t_B^3$, the time when the message is transmitted, can be computed and included in the message before the message is transmitted.

The CLOCKDATA message 124 contains the clock server identification, clock client identification, the shift of the client clock, and the propagation time between server and client.

Figure 5:
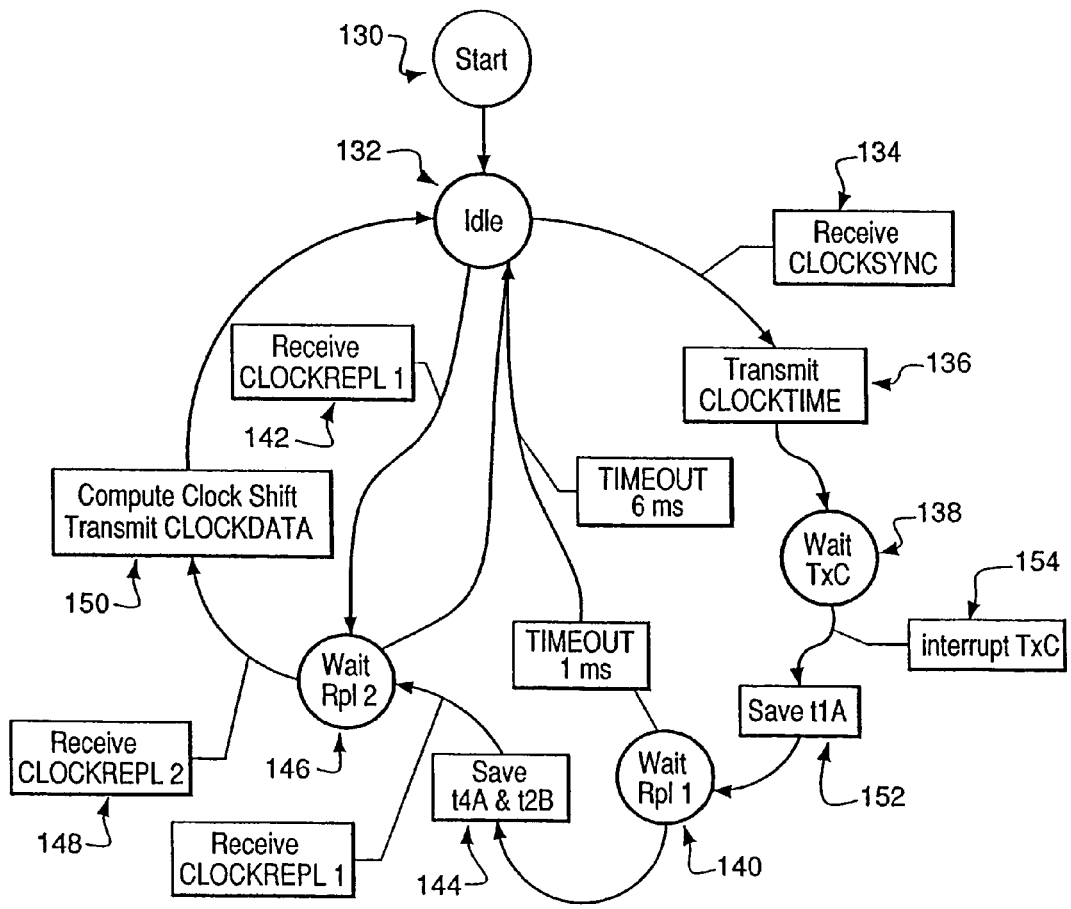
FIG. 5 is a flow chart showing an example of the server states existing during clock synchronization in accordance with an embodiment of the present invention.

In FIG. 3, the reference node 126, or server node A in this case, incorporates exchange messages into clock server tasks, with which synchronization of client node clocks is achieved. In doing so, the server progresses through a series of operational states for each client node with which synchronization is occurring as shown in FIG. 5. In FIG. 5, a separate server state cycle is associated with each neighbor node requesting synchronization, as the server can provide services to more than one neighbor node at any time.

In a first state, or "Start" state 130 of FIG. 5, the clock server task at the reference node is initialized. When a new neighbor node is added to the table, the clock server task associated with the additional node is set to the "Start" state 130 at the server. The state transitions from "Start" to "Idle" 132 when initialization of the node is complete.

In the "Idle" state 132 of FIG. 5, the clock server task waits for a CLOCKSYNC or CLOCKREPL1 message, whichever occurs first. As noted above, a CLOCKSYNC message is a request to start a clock synchronization session, sent by a requesting node to the server. A CLOCKREPL1 message is a first reply by the requesting node to the server CLOCKTIME message, containing the $t_B^2$ time when the CLOCKTIME message from the server was received by the requesting node.

When a CLOCKSYNC message is received by the server at 134 in FIG. 5, the server task directs the modem to transmit the CLOCKTIME message at 136 and enters a "Wait TxC" state at 138. In this state, the task waits for the completion the sync sequence that generates a TxC interrupt at 154. The transmission time of the previous message is saved as $t_A^1$ at 152 and the task enters the state "Wait Repl1" state at 140.

When a CLOCKREPL1 message is received by the server at 142 in FIG. 5, the server task directs the server to save the times $t_A^4$ and $t_B^2$ at 144, and enters the "Wait Repl2" state at 146. When the CLOCKREPL2 message is received at 148, the clock reading $t_B^3$ becomes available and the server can compute the neighbor clock shift. It is transmitted back to client with the CLOCKDATA message at 150.

Any neighbor node that has less than 5 seconds until the time when it has to request a next clock synchronization should answer the CLOCKTIME message within 5 ms after receiving it. When the clock server is in any state waiting for a message from correspondents, it returns to the "Idle" state if no message is received in time.

Figure 6:
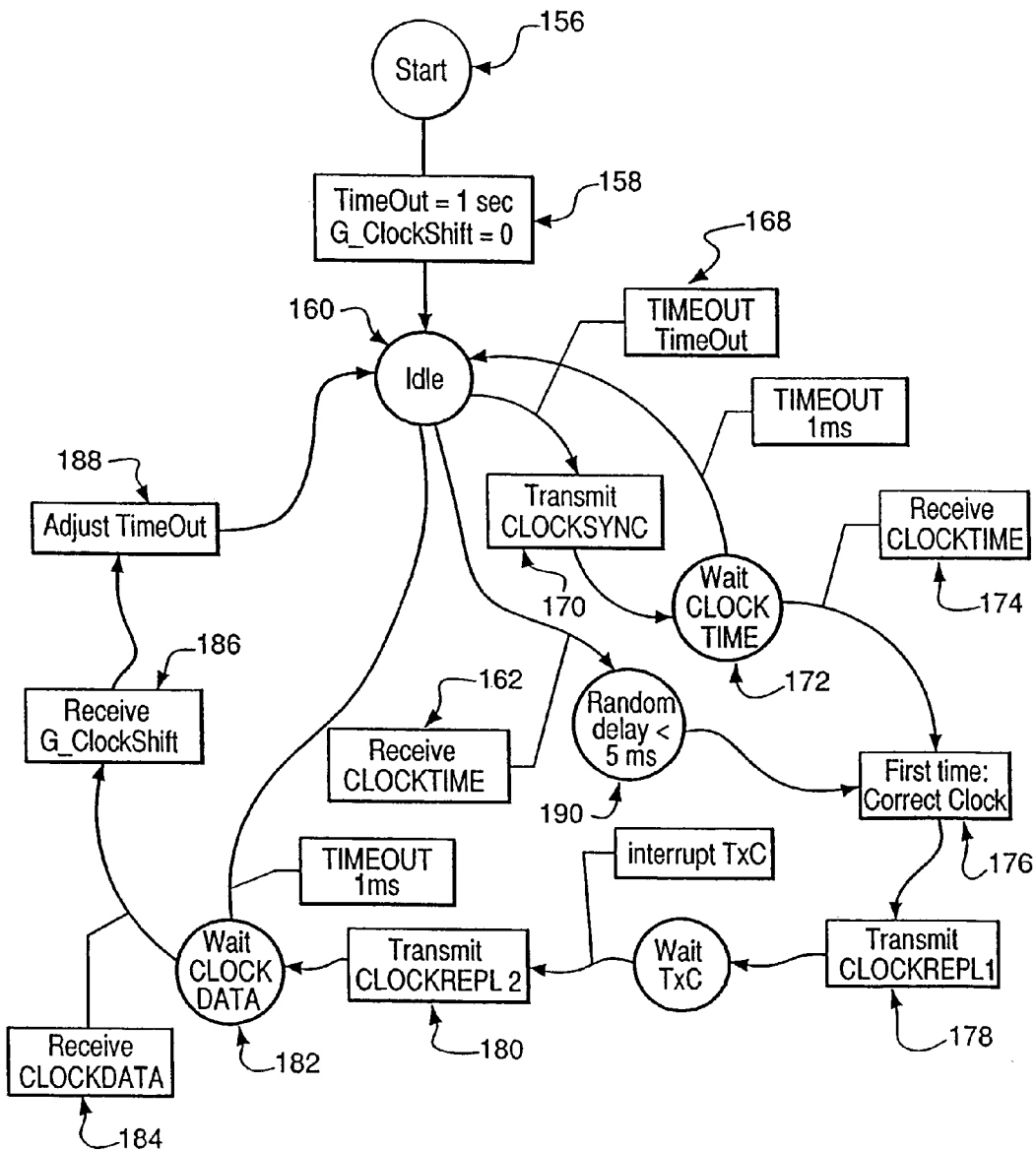
FIG. 6 is a flow chart showing an example of the client states existing during clock synchronization in accordance with an embodiment of the present invention.

In FIG. 3, the requesting node 128 that acts as client node B in this case, exchanges messages with the clock server tasks. In doing so, the client progresses through a series of operational states as shown in FIG. 6, which are node related. From "Start" at 156 in FIG. 6, the task initializes the "time out" variable at the client to one second and initializes the variable G_ClockShift to zero at 158. The G_ClockShift variable is computed at the end of the clock session and contains the clock correction. The correction itself is applied to clock during the ISR correcting the clock drift.

In the "Idle" state at 160 of FIG. 6, the client task waits for either a timeout interrupt at 168, or to receive a CLOCKTIME message at 162. The task answers the CLOCKTIME message only if the message is from it's clock server and there are less than 5 seconds until the next time out interrupt.

On time out interrupt 168 at the client in FIG. 6, the task directs the modem of the client node to transmit a request for starting the clock synchronization session, sending the CLOCKSYNC message to the server at 170, and entering the "WaitCLOCKTIME" state at 172. In "WaitCLOCKTIME" state, the task expects a CLOCKTIME message from the server, containing the time at the server in microseconds (32 bits).

Upon receiving the CLOCKTIME message for the first time at 174 in FIG. 6, the client performs a hoarse clock correction copying the server clock into its own clock register at 176 and replies with CLOCKREPL1 at 178. This ensures that the first time the client receives a CLOCKTIME message, $t_B^2$ is the same as the clock value in the CLOCKTIME message. Performing this hoarse correction allows the system to exchange only the last 8 bits of the clock registers without loosing any precision. Successive reception of the CLOCKTIME message does not require such hoarse correction as the content of the client and server clocks should show values differing by a few units only.

In FIG. 6, if a CLOCKTIME message is received by the client during an "Idle" state at 162, a random delay of up to 5 ms is applied at 190 before the CLOCKREPL1 reply message is transmitted to the server at 178. After reading the transmission time of the CLOCKREPL1 message, the CLOCKREPL2 reply message is transmitted to the server at 180. In systems with modems that are able to start transmitting messages at a predefined time (i.e. modems that include the ability to hold the transmission until the clock shows a specified value), a single message CLOCKREPL can be used. In this case the message contains all information. The clock client task enters the "WaitCLOCKDATA" state at 182 while waiting for the CLOCKDATA message from the server.

The CLOCKDATA message received from the server at 184 in FIG. 6 contains the clock shift correction. The value of the correction is retrieved from the message and stored in G_ClockShift variable at 186. This value is used during the execution of the ISR presented in FIG. 4 for correcting the shift and the drift of the local clock. If the clock shift is zero or only one unit, the task sets the timeout for the next clock session to twice the actual value at 188. This procedure allows the system to increase the time exponentially between successive clock sessions if the clock shift does not change substantially from one session to the next. This is concordant with the fact that small values of clock shift are typically an accurate indication that the drift correction algorithm has the correct parameters and there is no need for frequent adjustment of these parameters.

The time between two clock synchronization sessions as described above can be increased to any value that does not cause the loss of clock ticks due to the "jitter" of the quartz oscillator driving the node clock. For most oscillators, such an interval is about 20–30 minutes. If size of the clock shift is between 2 and 4 units, the time interval between sessions is not changed. If the clock shift is larger than 4 units, the time interval to the next clock session is reduced to half of the previous interval, but not smaller than one second.

The server described above can operate in both connected and isolated networks, and is selected by clients for reference purposes based upon the network configuration. Connected networks provide connections to land services and typically include one or more active IAPs. Isolated networks however, do not have IAP connections. In this case, the members of the network do not have access to land services, but can provide services within the network. The selection of the server by client nodes takes this into consideration.

When starting a synchronization procedure in accordance with an embodiment of the present invention described herein, a first client, or node 102 of network 100 in FIG. 1, assumes that it is isolated and sets it's communication "hop" number to zero. As can be appreciated by one skilled in the art, "hops" refer to communication routing where data packets are routed from a source to a destination by "hopping" from one node to another in an ad-hoc wireless network. After receiving messages from neighbor nodes, such as routine routing advertisements (RAs), the client identifies the smallest hop number received, and sets it's own hop number to the minimum received hop number plus one. From all neighbor nodes with hop numbers less than the client's own hop number, the client selects the neighbor with the strongest received signal as it's clock server, or reference node. The five-second prediction available for Adaptive Transmission Protocol (ATP) can be used for selecting the most reliable clock server.

If the client is actually located in a connected network the client ignores all neighbor nodes not connected to an IAP while setting it's own hop number if at least one neighbor node has such a connection to an IAP. From all neighbor nodes connected to an IAP with hop numbers less than the client's own hop number, the client selects the connected neighbor with the strongest received signal as it's clock server.

As stated earlier, if none of the neighbor nodes have connections to land services, the network is isolated. If the client is located in an isolated network, the root node of the network provides the clock reference for the whole network. A client connected to an isolated network selects as it's clock server the neighbor with the smallest hop number and strongest signal. When two isolated clients start communicating with one another, the one that "speaks" first is selected as root of the network and provides the clock reference.

At the time the server is selected therefore, it requires the smallest number of hops to reach the client and can provide the best signal. In mobile environments, these characteristics are changing in time, due to the movement of either the client, server or network. This in turn, requires the client to constantly monitor the server status, and change servers if another server becomes the optimum choice. A client should only look for another server if the previous server either was removed from the neighbor table, did not answer two successive requests for clock synchronization, disconnects from the network or the server hop number becomes larger or equal to the station hop number. When the server is lost, or during the operations changing the server, the current algorithm for drift correction described below remains active using previously computed data.

Furthermore, to prevent the search for a clock server entering an infinite loop, a clock client should not increase its hop number while seeking a clock server. If the client cannot find any neighbor with a smaller hop number than it's actual hop number, a client must advertise itself as "isolated" and refrain from searching for a clock server for at least one advertising cycle. After such refrain, the client may once again start searching for the neighbor that can provide clock services.

Figure 7:
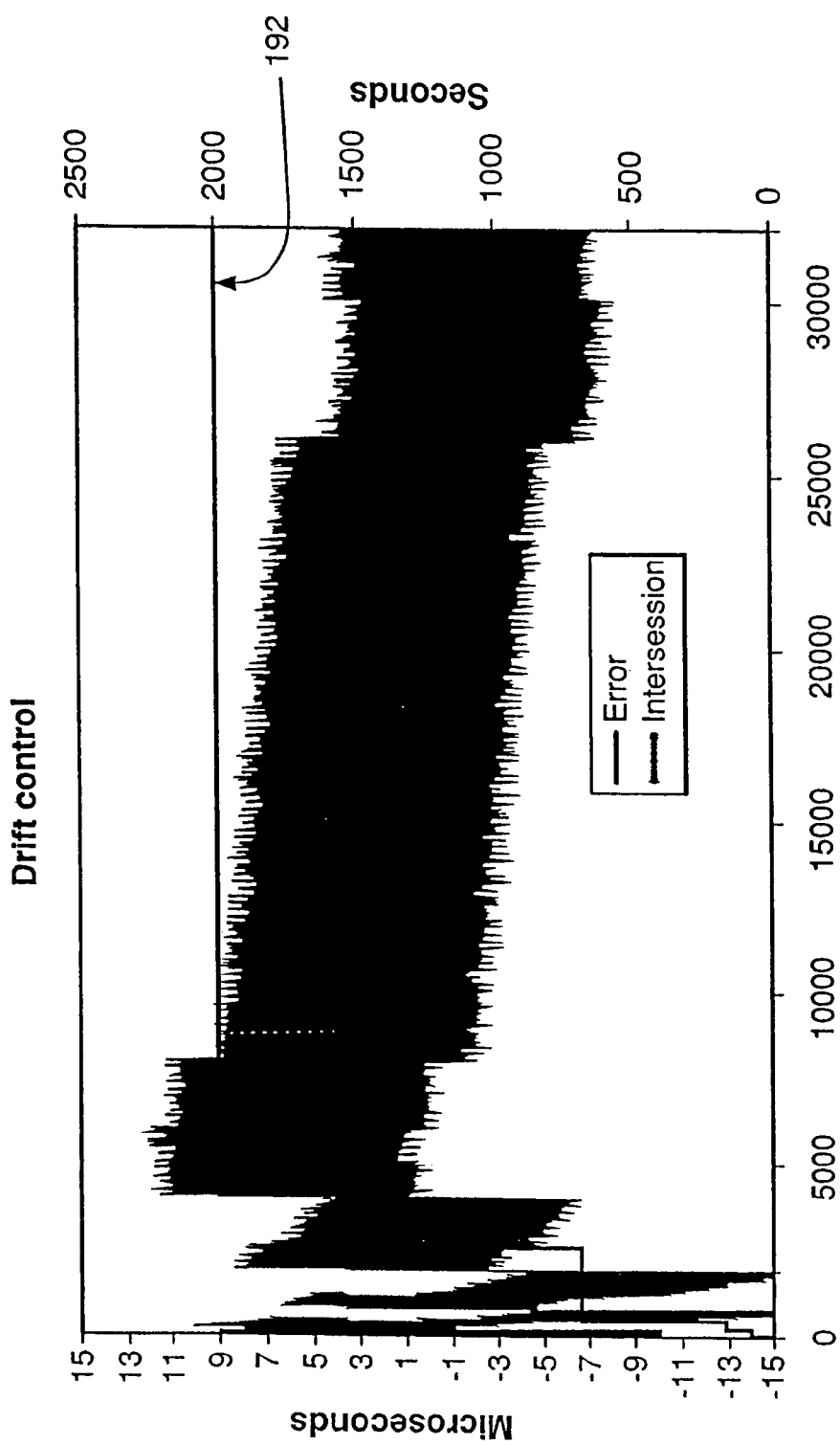
FIG. 7 is a graph showing an example of shift error when using drift control every 5 seconds in accordance with an embodiment of the present invention.

The results of the application of the embodiment described above are shown in FIGS. 7, 8 and 10. FIG. 7 shows a graph of the expected errors for two clocks with a relative drift of 2.15 ppm when the drift correction algorithm is run once every 5 seconds. The plot shows the variation of errors between two clocks for approximately 9 hours, measured at the beginning of each second. Excluding the first 5 five seconds, the clock errors of FIG. 7 have variations within ±15 microseconds. Line 192 in FIG. 7 is associated with the left vertical scale and represents the interval between clock sessions in seconds. The interval between sessions has an initial value of 3 seconds between sessions and rapidly increases to 2000 seconds between two successive sessions.

Figure 8:
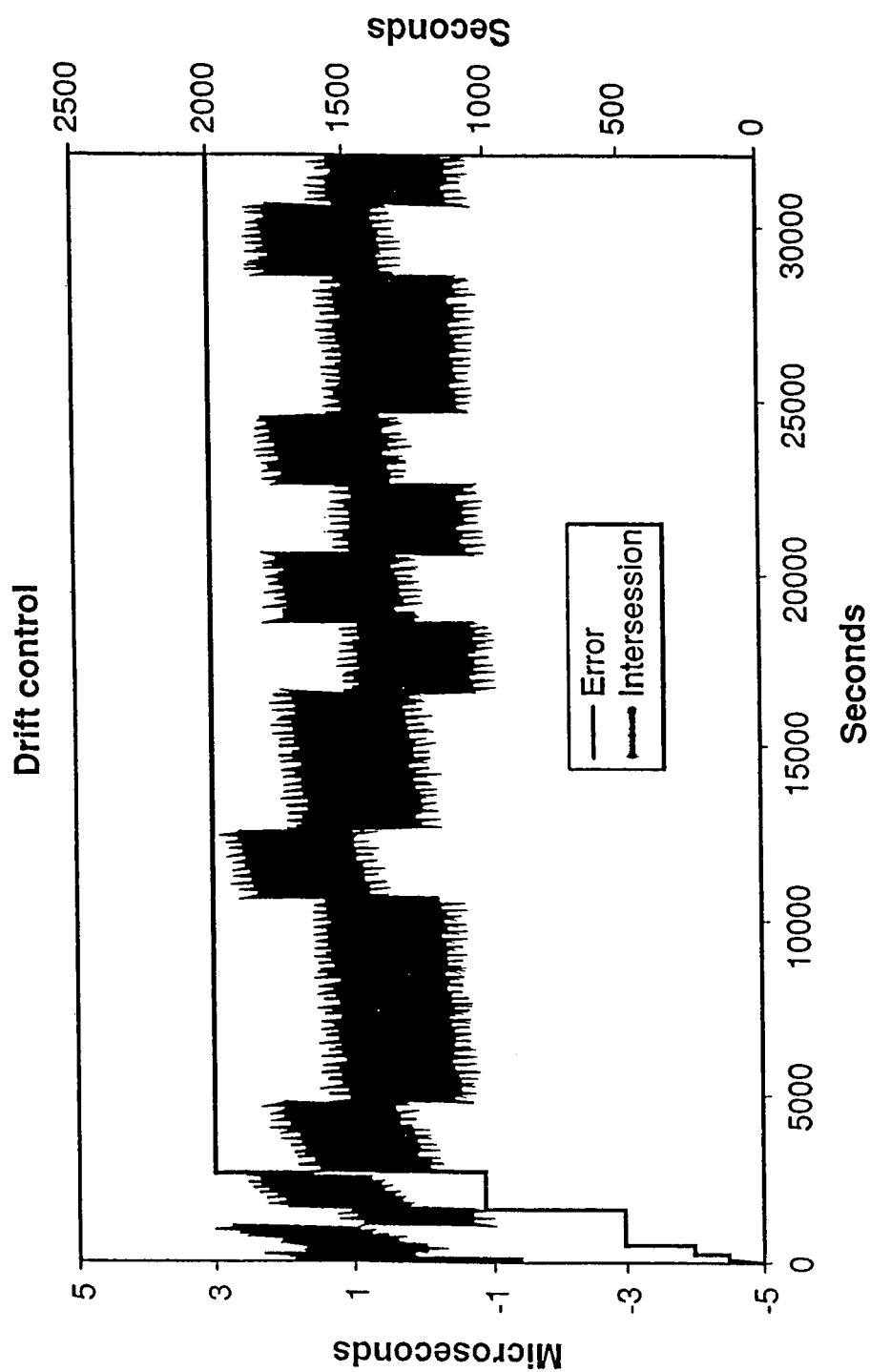
FIG. 8 is a graph showing an example of shift error when using drift control every 0.5 seconds in accordance with an embodiment of the present invention.

In similar fashion, FIG. 8 shows a graph of shift errors when the drift is corrected every 500 ms for a pair of clocks with 2.15 ppm clock drift. In comparison with FIG. 7, the errors are much smaller, while the interval between sessions converges towards 2,000 seconds much faster. Therefore utilizing the embodiment of the invention described above, better control of clock shift results in smaller number of clock synchronization sessions.

Testing the embodiment of the present invention may be achieved through the approximation of drift values for server and client nodes. The successive drift approximations $\delta_n$ are computed in equation (8).

$$\delta_n = \frac{\sum_{i=1}^{n} \Delta_i}{t_n - t_0} \tag{8}$$

Where the series of $\delta_n$ has the property: $\delta_n \to \delta$ when $n \to \infty$.

For computing the drift approximations $\delta_n$, all $\Delta_i$ corrections made to the TDMA register resulting from clock synchronization sessions and from the drift control algorithm are collected, along with the times the corrections were made $t_i$. It is not necessary to collect individual values, but the summation of values.

Figure 9:
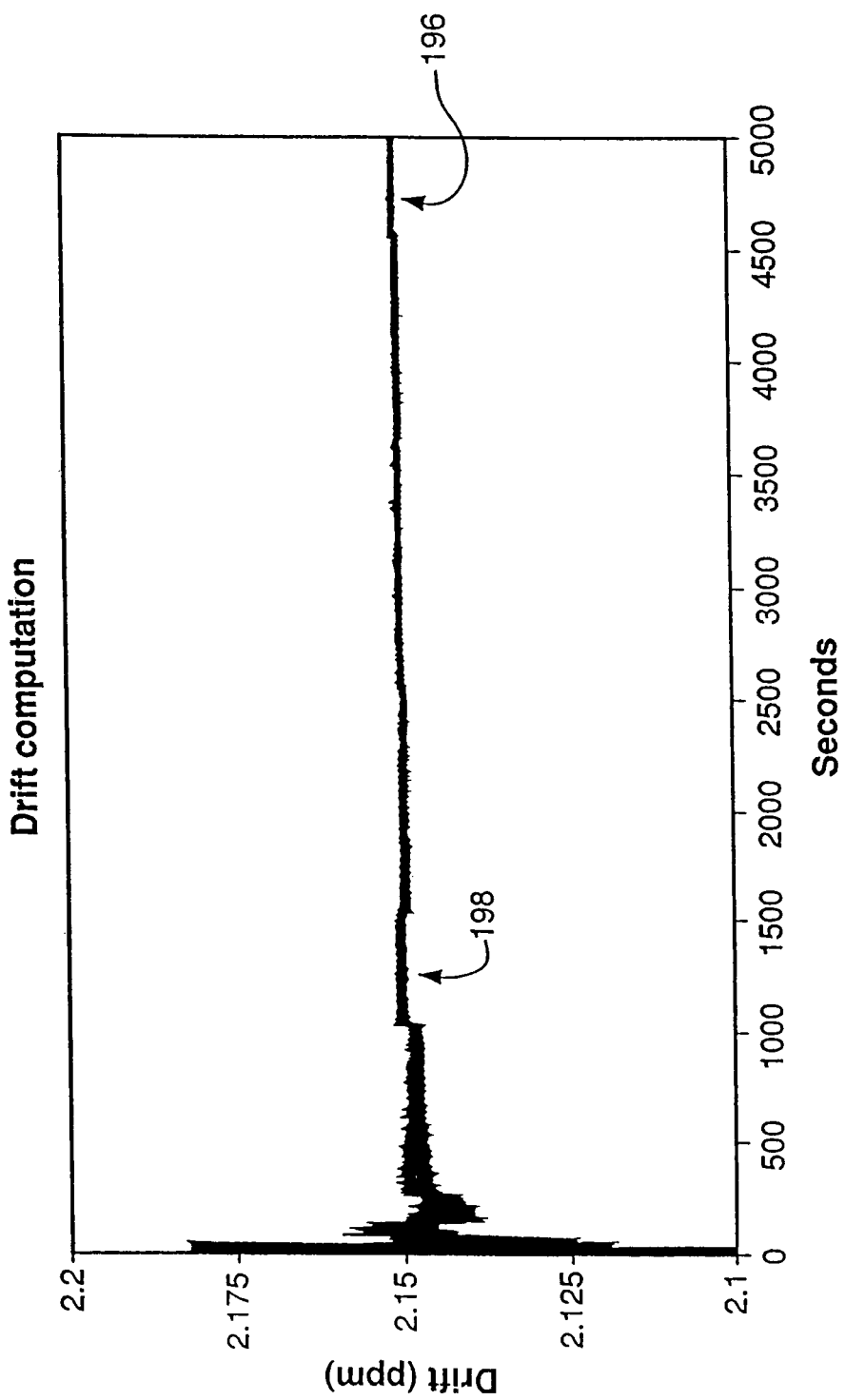
FIG. 9 is a graph showing an example of drift estimations in accordance with an embodiment of the present invention.

All values of $\delta_n$ are computed with equation (8) then plotted. In equation (8), $t_0$ is the time when the first clock correction was made, however the first correction $\Delta_0$ computed at time $t_0$ is not used in equation (8). In equation (8) the summation starts with i=1, not from i=0. The resulting plot of $\delta_n$ values appears as FIG. 9. The most accurate value of $\delta_n$ appears at the far right of FIG. 9 at 196. If the oscillator has drift variations because of temperature changes or some other cause, line 198 will show oscillations instead of being horizontal.

The embodiment of the present invention presented here allows fast clock synchronization and dynamic drift correction of nodes using clocks with almost constant drift, regardless how large the drift may be. The embodiment should reduce the amount of overhead for voice data transfer by at least 1.4 ms per voice packet, or 35%. For example, maintaining two clocks affected by ±1 ppm drift, synchronized at less than ±3 μs apart, the present embodiment requires exchanges every 35 minutes, consisting of five messages having 60 bits each, to correct the drift of the internal clock every second. The extra load for a 16 MHz CPU for supporting this operation is about 0.0002%, while the overhead air traffic overhead is 2 ms every 2,000 seconds or 0.0001%.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

APPENDIX

```
static unsigned long correctionControl = 0;
static unsigned long remoteClock = 0;
static long        driftControl = 0;
int                G_ClockShift, G_ClockSession;
// for testing only.
unsigned long      G_TDMA_register;
//**********************************************************
//   Initialize drift control variables
//**********************************************************
void          drift_Init(void)
{
correctionControl = 0;
remoteClock = 0;
driftControl = 0;
G_ClockShift = 0;
G_ClockSession = 0;
// insert here code for activating first interrupt
}
//**********************************************************
//   Correct clock drift
//**********************************************************
void          drift_ISR(void)
{
int  corr=0;
// postpone correction if session is underway
if (G_ClockSession == 0)
    {
    //   Check for integer overflow
    if (remoteClock > ULONG_MAX/2)
       {
       correctionControl >>= 1;
       driftControl >>= 1;
       remoteClock >>= 1;
       }
    //   Don't compute correction for the first time
    if (remoteClock != 0)
       {
       //   compute the correction
       corr = correctionControl / remoteClock;
       //   Adjust the control
       correctionControl %= remoteClock;
       }
    }
// Advance the access counter (remote station uncorrected clock)
remoteClock++;
// take care of correction sign
if (driftControl < 0)
     corr = -corr;
// take in account the last shift and the drift
driftControl += G_ClockShift + corr;
// cancel the shift
```

APPENDIX-continued

```
G_ClockShift = 0;
// advance the control
correctionControl += abs(driftControl);
// correct the clock
G_TDMA_register += corr;
// insert here the code for activating next interrupt
}
```

What is claimed is:

1. A method for controlling clock synchronization between at least two nodes of a plurality of nodes in an ad-hoc wireless network, comprising:
   controlling a client node of said plurality of nodes to select a reference node from said plurality of nodes and to send to said reference node a first communication, said client node having a client clock and said reference node having a reference clock;
   controlling said reference node to receive said first communication and in response, send a first reply to said client node;
   controlling said client node to receive said first reply and in response, send a second and third communication to said reference node; and
   controlling said reference node to receive said second and said third communications and in response, calculate a first clock shift and propagation value existing between said client node and said reference node, and send information pertaining to said first clock shift and said propagation value to said client node in a second reply.

2. A method as claimed in claim 1, further comprising:
   controlling said client node to select said reference node based upon network connectivity.

3. A method as claimed in claim 1, wherein said first communication comprises a request for clock synchronization.

4. A method as claimed in claim 3, wherein said first communication further comprises a CLOCKSYNC message including client clock and reference clock information, said CLOCKSYNC message requesting a clock synchronization session between said client node and said reference node.

5. A method as claimed in claim 1, wherein said first reply comprises a CLOCKTIME message including a first reference clock value.

6. A method as claimed in claim 5, wherein said first reference clock value comprises a reference clock value at a time of transmission of said first reply from said reference node to said client node.

7. A method as claimed in claim 6, wherein said reference clock value comprises a 32 bit value.

8. A method as claimed in claim 1, wherein said second communication comprises a CLOCKREPL1 message including a first client clock value, and said third communication comprises a CLOCKREPL2 message including a second client clock value.

9. A method as claimed in claim 8, wherein said first client clock value comprises a client clock value at a time of reception of said first reply from said reference node by said client node.

10. A method as claimed in claim 8, wherein said second client clock value comprises a client clock value at a time of transmission of said second communication from said client node to said reference node.

11. A method as claimed in claim 1, further comprising:
controlling said client node to synchronize said client clock with said reference clock using said first clock shift and said propagation value.

12. A method as claimed in claim 1, further comprising:
controlling at least one of said client node and said reference node to calculate a second clock shift and a second propagation value and in response, determine a clock drift of said client clock; and
further controlling at least one of said client node and said reference node to correct said clock drift of said client clock using said determined clock drift and a drift control algorithm.

13. A method as claimed in claim 12, wherein said drift control algorithm comprises a computer-readable medium of instructions for controlling clock drift correction at a node in the ad-hoc wireless network, said computer-readable medium of instructions comprising:
a first set of instructions, adapted to control at least one of said client node and said reference node to generate a drift correction value and correct said clock drift of said client clock using said drift correction value.

14. A method as claimed in claim 1, wherein:
said step of controlling said reference node to receive said first communication includes initializing said reference node, and said first reply to said client node includes a clock synchronization message.

15. A method as claimed in claim 1, wherein:
said step of controlling said client node to select said reference node includes initializing said client node;
said first reply to said client node includes a clock synchronization message; and
said method further includes the step of controlling said client node to correct said client clock using said propagation value sent from said reference node.

16. A method for controlling clock synchronization between at least two nodes of a plurality of nodes in an ad-hoc wireless network, comprising:
controlling a clock synchronization message exchange between a client node and a reference node of said plurality of nodes;
controlling said reference node to calculate a first clock shift and a propagation value existing between said client node and said reference node in response to said clock synchronization message exchange and provide information pertaining to said first clock shift and said propagation value to said client node; and
controlling said client node to synchronize a client clock at said client node with a reference clock at said reference node using said information.

17. A method as claimed in claim 16, further comprising:
controlling said client node to select said reference node for clock synchronization message exchange based upon network connectivity.

18. A method as claimed in claim 16, wherein said step of controlling said clock synchronization message exchange uses node tasks comprising at least one of the following:
a set of reference node tasks, adapted to initialize said reference node, further adapted to direct said reference node to exchange clock synchronization messages with said client node; and
a set of client node tasks, adapted to initialize said client node, further adapted to direct said client node to exchange clock synchronization messages with said reference node.

19. A method as claimed in claim 16, wherein said step of controlling said client node to synchronize the client clock comprises performing a drift control algorithm to control at least one of said client node and said reference node to generate a drift correction value and correct said clock drift of said client clock using said drift correction value.

20. A computer-readable medium of instructions for controlling clock synchronization between at least two nodes of a plurality of nodes in an ad-hoc wireless network, the computer-readable medium of instructions comprising:
a first set of instructions, adapted to control a client node of said plurality to select a reference node from said plurality of nodes and send to said reference node a first communication, said client node having a client clock and said reference node having a reference clock;
a second set of instructions, adapted to control said reference node to receive said first communication and in response, send a first reply to said client node;
said first set of instructions further adapted to control said client node to receive said first reply and in response, send a second and third communication to said reference node; and
said second set of instructions further adapted to control said reference node to receive said second and said third communications and in response, calculate a first clock shift and propagation value existing between said client node and said reference node, and send information pertaining to said first clock shift and said propagation value to said client node in a second reply.

21. A computer-readable medium of instructions as claimed in claim 20, wherein said first set of instructions are further adapted to control said client node to select said reference node based upon network connectivity.

22. A computer-readable medium of instructions as claimed in claim 20, wherein said first communication comprises a request for clock synchronization.

23. A computer-readable medium of instructions as claimed in claim 22, wherein said first communication further comprises a CLOCKSYNC message including client clock and reference clock information, said CLOCKSYNC message requesting a clock synchronization session between said client node and said reference node.

24. A computer-readable medium of instructions as claimed in claim 20, wherein said first reply comprises a CLOCKTIME message including a first reference clock value.

25. A computer-readable medium of instructions as claimed in claim 24, wherein said first reference clock value comprises a reference clock value at a time of transmission of said first reply from said reference node to said client node.

26. A computer-readable medium of instructions as claimed in claim 25, wherein said reference clock value comprises a 32 bit value.

27. A computer-readable medium of instructions as claimed in claim 20, wherein said second communication comprises a CLOCKREPL1 message including a first client clock value, and said third communication comprises a CLOCKREPL2 message including a second client clock value.

28. A computer-readable medium of instructions as claimed in claim 27, wherein said first client clock value comprises a client clock value at a time of reception of said first reply from said reference node by said client node.

29. A computer-readable medium of instructions as claimed in claim 27, wherein said second client clock value comprises a client clock value at a time of transmission of said second communication from said client node to said reference node.

30. A computer-readable medium of instructions as claimed in claim 20, wherein said first set of instructions is further adapted to control said client node to synchronize said client clock with said reference clock using said first clock shift and said propagation value.

31. A computer-readable medium of instructions as claimed in claim 20, wherein:
said first set of instructions are further adapted to control at least one of said client node and said reference node to calculate a second clock shift and a second propagation value and in response, determine a clock drift of said client clock; and
said first set of instructions further adapted to control at least one of said client node and said reference node to correct said clock drift of said client clock using said determined clock drift and a drift control algorithm.

32. A computer-readable medium of instructions as claimed in claim 31, wherein said algorithm comprises a third set of instructions, adapted to control at least one of said client node and said reference node to generate a drift correction value and correct said clock drift of said client clock using said drift correction value.

33. A computer-readable medium of instructions for controlling clock synchronization between at least two nodes of a plurality of nodes in an ad-hoc wireless network, the computer-readable medium of instructions comprising:
a first set of instructions, adapted to control a clock synchronization message exchange between a client node and a reference node of said plurality of nodes;
a second set of instructions, adapted to control said reference node to calculate a first clock shift and a propagation value existing between said client node and said reference node in response to said clock synchronization message exchange and provide information pertaining to said first clock shift and said propagation value to said client node; and
and a third set of instructions, adapted to control said client node to synchronize a client clock at said client node with a reference clock at said reference node using said information.

34. A computer-readable medium of instructions as claimed in claim 33, further comprising:
a fourth set of instructions, adapted to control said client node to select said reference node for clock synchronization message exchange based upon network connectivity.

35. A computer-readable medium of instructions as claimed in claim 33, wherein said first set of instructions uses node tasks comprising at least one of the following:
a set of reference node tasks, adapted to initialize said reference node, further adapted to direct said reference node to exchange clock synchronization messages with said client node; and
a set of client node tasks, adapted to initialize said client node, further adapted to direct said client node to exchange clock synchronization messages with said reference node.

36. A computer-readable medium of instructions as claimed in claim 33, wherein said third set of instructions is further adapted to performing a drift control algorithm to control at least one of said client node and said reference node to generate a drift correction value and correct a clock drift of said client clock using said drift correction value.

* * * * *